United States Patent [19]

Melton et al.

[11] Patent Number: 5,133,061
[45] Date of Patent: Jul. 21, 1992

[54] MECHANISM FOR IMPROVING THE RANDOMIZATION OF CACHE ACCESSES UTILIZING ABIT-MATRIX MULTIPLICATION PERMUTATION OF CACHE ADDRESSES

[75] Inventors: Evelyn A. Melton, Poughkeepsie; Vern A. Norton, Croton-On-Hudson; Gregory F. Pfister, Briarcliff Manor; Kimming So, Armonk, all of N.Y.

[73] Assignee: International Business Machines Corporation, Armonk, N.Y.

[21] Appl. No.: 596,625

[22] Filed: Oct. 11, 1990

Related U.S. Application Data

[63] Continuation of Ser. No. 114,907, Oct. 29, 1987, abandoned.

[51] Int. Cl.$^5$ .................. G06F 7/544; G06F 7/58; G06F 9/315; G06F 12/10
[52] U.S. Cl. .................. 395/425; 364/224; 364/224.3; 364/228.2; 364/238.7; 364/245.1; 364/256.3; 364/255.1; 364/259.5; 364/259.6; 364/259.9; 364/261; 364/243.41; 364/262.9; 364/256.4; 364/DIG. 1; 364/258.2; 364/259.8
[58] Field of Search ... 364/200 MS File, 900 MS File

[56] References Cited

U.S. PATENT DOCUMENTS

| | | |
|---|---|---|
| 4,332,010 | 5/1982 | Messina et al. |
| 4,441,155 | 4/1984 | Fletcher et al. ............... 364/200 |
| 4,461,001 | 7/1984 | Bossen et al. |
| 4,489,378 | 12/1984 | Dixon et al. ............... 364/200 |
| 4,533,995 | 8/1985 | Christian et al. ............... 364/200 |
| 4,775,955 | 10/1988 | Liu ............... 364/900 |

OTHER PUBLICATIONS

L. Liu "XOR Randomization in Cache Congruence Class Indexing" IBM Technical Disclosure Bulletin, vol. 27, No. 2 (Jul. 1984), p. 1097.

Computing Surveys, vol. 14, No. 3, Sep. 1982, pp. 473-530, "Cache Memories" by Alan Jay Smith.

Primary Examiner—Thomas C. Lee
Assistant Examiner—Daniel Pan
Attorney, Agent, or Firm—Roy R. Schlemmer; Jack M. Arnold

[57] ABSTRACT

An electronic computer system including a central processor and a hierarchical memory system having a large relatively low speed random access system memory and a small high speed set-associative cache memory including a data store section for storing lines of data from the system memory and a cache directory for indicating, by means of line identifier fields at any time, the lines of the system memory data currently resident in cache, is provided with a way to improve the distribution of data across the congruence classes within the cache. A mechanism is provided for performing a permutation operation on an M bit portion (X) of the system memory address, which permutation determines the congruence class into which the address will map. The permutation mechanism performs a bit-matrix multiplication of said M-bit address with an M × M matrix (where M is a real positive integer greater than 1) to produce a permuted M-bit address (X'). The directory controls utilize the permuted M-bit address (X') to determine the congruence class of any given memory access and automatically access the congruence class of the permuted address (X') subsequent to the permutation operation to determine if one of the line identifiers which identifies, every member of a congruence class currently stored in the directory, matches an identifier field from the memory access request from the CPU. If the match is successful the data store portion of the cache is accessed at the permuted M-bit address (X') and the requested data line is accessed at the address field specified by the CPU.

7 Claims, 5 Drawing Sheets

$$\begin{array}{c} R_0 \\ R_1 \\ R_2 \\ R_3 \\ R_4 \\ R_5 \\ R_6 \end{array} \left( \begin{array}{ccccccc} 0 & 0 & 0 & 0 & 0 & 1 & 1 \\ 0 & 0 & 0 & 0 & 1 & 0 & 1 \\ 0 & 0 & 0 & 1 & 1 & 1 & 1 \\ 0 & 0 & 1 & 0 & 0 & 0 & 1 \\ 0 & 1 & 1 & 0 & 0 & 1 & 1 \\ 1 & 0 & 1 & 0 & 1 & 0 & 1 \\ 1 & 1 & 1 & 1 & 1 & 1 & 1 \end{array} \right)$$

MECHANISM FOR IMPROVING THE RANDOMIZATION OF CACHE ACCESSES UTILIZING ABIT-MATRIX MULTIPLICATION PERMUTATION OF CACHE ADDRESSES

This application is a continuation of application Ser. No. 07/114,907 filed Oct. 29, 1987 now abandoned.

CROSS REFERENCES TO RELATED COPENDING APPLICATIONS

Copending U.S. patent application Ser. No. 07/114,909 filed Oct. 29, 1987 entitled "AN APERIODIC MAPPING METHOD TO ENHANCE POWER-OF-TWO STRIDE ACCESS TO INTERLEAVED DEVICES" of K. P. McAuliffe et al, and assigned to the same assignee as the present invention describes an address permutation/interleaving procedure for improving power-of-two stride access. This results in substantially equal utilization of all interleaved physical devices if they are referenced in any power-of-two stride. The key element of the procedure is a bit-matrix multiplication of an n bit logical address with a matrix consisting of p rows wherein each row contains n bits to produce a p bit physical address. When a suitable matrix is chosen, addresses will be evenly distributed across the devices even with a power-of-two stride in the logical address.

The type of bit-matrix multiplication address permutation method disclosed is the same as that generally described in and envisioned by the permutation architecture of the present invention. The invention of this copending application is directed to the broad method or procedure of achieving address permutations or hashing of a subject data field to achieve unique mappings onto another data field whereby unique advantages are obtained such as the elimination of undesirable address groupings in a large interleaved shared memory system where power-of-two stride access occurs frequently. As will be described more fully subsequently the present invention is directed to the optimized use of a single cache by a single processor wherein the randomization technique achieves optimized utilization of the congruence classes of the cache.

Copending U.S. patent application Ser. No. 07/114,795 filed Oct. 29, 1987 (now abandoned) entitled: "A HARDWARE MECHANISM FOR THE DYNAMIC CUSTOMIZATION OF PERMUTATION USING BIT-MATRIX MULTIPLICATION" of E. Melton et al, and assigned to the same assignee as the present invention, discloses a permutation mechanism that increases memory or device bandwidth by allowing flexibility in customizing a bit-matrix multiply permutation function in hardware for a specfic operating environment without requiring any changes to the physical hardware.

The type of bit-matrix multiply permutation function disclosed in this copending application is generally the same as that disclosed in the present invention. In addition, the development of other customized matrices is also described. The hardware of this application allows the different matrices to be readily transferred into the matrix storage medium whereby the resulting permutation mechanism is customized for a particular application whether the CUSTOMIZATION is required by the data access behaviors of the application, or by other critical operating requirements.

U.S. Pat. No. 4,754,394, of Brantley et al, assigned to the same assignee as the present invention, entitled "DYNAMICALLY ALLOCATED LOCAL/GLOBAL STORAGE SYSTEM", discloses a highly parallel processing system having a large interleaved, shared memory system wherein the individual memory modules are distributed among the various processors. An interconnection network is provided together with a suitable memory management means so that any processor can readily access any memory module in the system. Further, the system architecture allows the concurrent accessing of processor to all the modules, providing of course, that no conflicts exist, e.g., more than one to gain access to a particular memory module. The present memory mapping procedure which is designed to avoid or minimize such conflicts would have particular utility in the memory management facility of such a memory system.

FIELD OF THE INVENTION

The present invention relates to the field of data processing systems. More particularly it comprises a method and apparatus which improves the performance of a set associative cache of a CPU in such a system. Still more specifically, it provides a way for increasing the space utilization by randomizing the space allocation of a set associative storage.

BACKGROUND OF THE INVENTION

Cache memories are small, high-speed stores that are frequently included in the CPU architectures of data processing systems. The storage unit of a cache is called a line which can hold a consecutive segment of data in the memory. When a CPU uses a piece of data, the cache is searched for the line containing the data. If the line is already in the cache, the piece of data is sent immediately to the CPU, otherwise the whole line will be loaded from the memory into the cache. By automatically maintaining recently used lines in the cache, an entire memory system of a computer can be made to appear as fast as the cache. An important measure of the performance of a cache memory is the Buffer Hit Ratio (BHR): the percentage of memory accesses that are satisfied by the cache without having to access slower main memory. Alternatively, one can examine the BHR's inverse, the Buffer Miss Ratio (BMR). Cache performance depends on the application code being run. In particular, the better the code exhibits "spatial locality", the more its references are to closely-spaced elements of its address space and thus the higher a BHR (or lower BMR) will be achieved.

Since a cache can contain thousands of lines, in order to reduce its search time, very often it is logically organized in a two-dimensional storage of rows and columns. In such a case, cache accesses are memory mapped, a consecutive segment of data from the memory that makes up a cache line is assigned uniquely to a row and each row has its own independent logic for controlling the line replacement. These rows, which are called congruence classes, allow any cache line to be accessed in a fixed amount of time. The disadvantage is when the congruence classes are not evenly utilized as a result of poor spatial locality of any running program, the hit ratio of a program can be decreased substantially. This is very likely a result of two factors. First, the number of congruence classes in a cache is always in the power of two, e.g., 128. Second, a running program usually accesses its data in a stride of a multiple of two, if not consecutive. These two factors can cause a small subset of the congruence classes in a cache to be heavily used while many others are unused. The purpose of the present invention is to alleviate such a problem.

A good survey on the organization, operation and design of cache memories can be found in A. J. Smith, "Cache Memories", ACM Computer Surveys, Vol. 14, 1982, pp. 473-530.

The present invention applies the pseudo randomization permutation scheme disclosed in previously referenced concurrently filed U.S. application Ser. No. 07/114,909 to the problem of deciding where in a set-associative cache to put data referenced by the code.

The present invention differs from that disclosed in the above referenced copending application in three principle ways. The first is that the current scheme applies to a cache storage which is a single physical device not multiple physical devices as in the previously referenced application. Secondly, while one of the main purposes of the application is to randomize the accesses from a plural number of sources, such as CPU's, among a plural number of devices, the present invention has for its primary purpose the randomization of accesses from one CPU to its own cache space. Finally, the directory look-up, to which the overall pseudo randomization scheme is applied herein, involves a key and an identifier (ID) for every cache access. This is specific to cache storage, and does not apply to memory or I/O devices.

DESCRIPTION OF PRIOR ART

In U.S. Pat. No. 4,489,378 of J. D. Dixon et al, a scheme which depends on the position of a requested line, loads a number of lines following a requested line from a secondary storage (DASD) to a disk cache. The purpose of this system is to effectively prefetch data into a cache before the data are really needed.

Another prefetch scheme for disk cache is described in U.S. Pat. No. 4,533,995 of J. H. Christian. In the Christian scheme, when a sequential access bit is sent to a secondary storage all data specified in a read command are fetched to the cache. If such prefetched data is replaced from cache and the sequential bit is still on, a subsequent request for part of the data causes the whole group of data to be loaded to the cache again.

The closest prior art system related to the present invention known to the inventors is described in an IBM Technical Disclosure Bulletin article entitled "XOR Randomization in Cache Congruence Class Indexing" of L. Liu, Vol. 27, No. 2, Jul. 1984, page 1097. However, the scheme in this article is different from the present invention in at least two significant respects. First, the present concept is applied to a CPU and its cache. The scheme is applied to an environment or cache which is simultaneously shared by a plural number of operating systems and CPU's. The purpose of randomization is to spread out access activities on the placement of system functions and data in the address spaces of the operating system which coincide with each other. Secondly, the randomization scheme of the article is simply an XOR of portions of high order bit to low order bits of the address of a cache access. This is quite different from the bit matrix multiplication scheme inherent in the present invention.

SUMMARY OF THE INVENTION

It is primary object of the present invention to provide a pseudo randomization mechanism for improving the utilization of a set of associative cache.

It is another object of the invention to provide such a mechanism for increasing the performance of a set of associative storage, when and executing program is accessing its data at a distance of multiples of two and possibly any data strides of regular patterns.

It is yet another object of the present invention to provide such a mechanism where the randomization procedure includes a bit-matrix multiplication permutation of predetermined fields of a physical memory address with a predetermined matrix to produce an improved distribution of memory utilization across the various congruence classes of the set associative cache.

The objects of the present invention are accomplished in general by a mechanism implemented in the front portion of the cache to uniformize the cache accesses over all of the congruence classes of the set associative cache of the CPU. The scheme is not limited to the first level cache, i.e., the cache closest to a particular CPU, but can be applied to any level of cache in a memory hierarchy.

It is a further object of the invention to provide such a randomization mechanism which utilizes a bit matrix multiplication permutation operation to provide the required distribution of addresses across the congruence classes of the cache.

It is a further object of the invention to provide such a mechanism which could be utilized equally well with either a virtual or real cache system.

The objects of the present invention are accomplished in general by an electronic computer system including a central processor and a hierarchical memory system having a large relatively low speed random access system memory and a small high speed cache memory. The cache memory includes a data store section for storing lines of data from the system memory and a cache directory for indicating, at any time, the lines of the system memory data currently resident in cache. The directory and data store are organized and accessible as a set of congruence classes into which any system memory address will map and a plurality of items in each class (set associativity), wherein a plurality of different addresses will map into any given class. Further hardware is provided for interrogating the cache memory for the presence of an item of data therein whenever a memory access is requested and for improving the distribution of data across said congruence classes including the performance of a permutation on an M-bit portion (X) of the system memory address, which permuted M-bit portion (X') determines the congruence class of the address. The permutation comprises performing a bit-matrix multiplication of said M-bit address with an M×M matrix, and the memory system subsequently utilizes the permuted M-bit address (X') to determine the congruence class of any given memory access.

The cache system organization includes further automatically accessing a congruence class of the permuted address (X') subsequent to the permutation to determine if one of the line identifiers which identifies every member of a congruence class currently stored in the directory matches an identifier field from the memory access request and if so, accessing the data store portion of the cache at the permuted M-bit address (X') and accessing a set of data lines therefrom, and further accessing a particular member of the set corresponding to the successful identifier search in the directory and utilizing the corresponding item of data for the particular type of memory access requested by the CPU.

The memory controls further include means for notifying the system memory when a particular identifier is not present in the directory at the congruence class indicated for producing a cache MISS sequence of operations.

The essence of the present invention resides in the method for providing the permutation of that portion of the (M-bit) memory address (X') which is utilized to designate a congruence class in both the cache directory and the cache data store. The method comprises performing successive bit-matrix multiplications of M-bits of the memory address with corresponding rows of an M-bit by M-bit permutation matrix to form M' new bits of address and utilizing these bits as the congruence class pointer in cache for the subject data. The procedure will work equally well for a real or a virtual cache organization and has been found to produce improved cache utilization where, e.g., certain power-of-two stride accesses in the memory would otherwise cause an uneven distribution of cache utilization across the congruence classes.

Where power-of-two address strides are likely to be encountered frequently the M-bit by M-bit matrix is configured so that the bottom row and right hand column of the matrix is comprised of all "1"s and all other bits are the exclusive OR of the two bits below and immediately to the right.

DESCRIPTION OF THE PREFERRED EMBODIMENT

Description of Theoretical Basis for Invention

Figure 1:
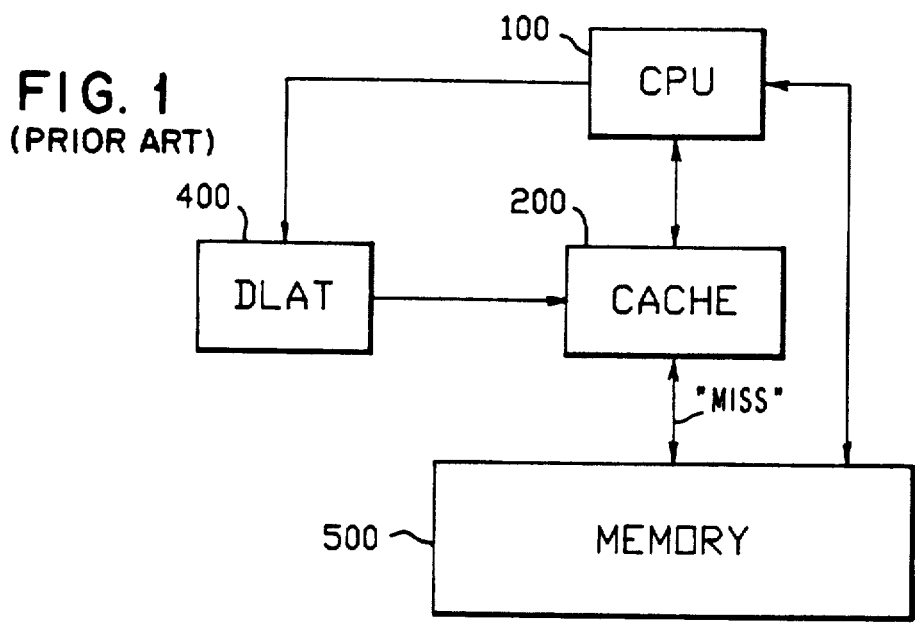
FIG. 1 comprises an organizational high level block diagram illustrating a computer system with a central processing unit and a hierarchical memory organization including a cache and a main memory.

The following description sets forth the mathematical basis of the present invention. The description is general in that it describes how the use of a bit-matrix multiplication of a subject address field will produce a permuted address mapping that will more evenly distribute a set of addresses separated by a power-of-two stride across a class of servers such as memory modulo or congruence classes whose number and thus addressability is also a power-of-two stride across a class of servers such as memory modulo or congruence classes whose number and thus addressability is also a power-of-two.

For an even more general description reference should be made to previously referenced copending U.S. application Ser. No. 07/114,909. For a different hardware application of the permutation reference should be made to previously reference copending U.S. application Ser. No. 07/114,795, now abandoned.

The method and hardware described herein overcome many of the disadvantages of prior art cache management systems which employ simple hashing techniques to achieve improved distribution of addresses across congruence classes in a cache memory system where power-of-two stride accesses are frequently encountered. The present method permutes a congruence class address space by applying a Boolean (or binary) matrix (bit-matrix) multiplication employing a specifically designed matrix. It will be clearly demonstrated that matrices can be chosen so as to eliminate power-of-two stride access contention in systems where the number of congruence classes is a power-of-two. Although the described technique has particular application for reducing congruence class contention problems for all powers-of-two stride accesses, it also tends to release excessive contention for all other non-power-of-two stride accesses.

The invention for practical considerations would normally be implemented in hardware, and is appropriate to be included in the cache memory congruence class or addressing hardware of a uniprocessor system and would be automatically invoked when any memory access is requested. It is also advantageous to include such hardware in the design of the individual processing elements of a multiprocessor system due to the frequent power-of-two address strides encountered in such systems.

The general method of obtaining improved power-of-two stride access will first be described. An algebraic condition is derived and shown to be sufficient for eliminating power-of-two stride access conflicts to memory in general. Procedures are given for the construction of bit-matrices satisfying the specified conditions. Performance analysis results are presented for one such matrix, showing the access conflicts associated with various strides. Finally, it will be shown how the general concept can be incorporated as part of the hardware congruence class address permutation mechanism of such a set associative cache memory architecture.

A Boolean or bit $r \times s$ matrix is a rectangular array of binary bits, arranged in r rows and s columns. Such matrices describe linear mappings from the vector space $F^s$ of s-tuples of bits to the space of $F^r$ of r-tuples of bits.

These are vector spaces over the field F=GF(2) of two elements, {0,1}. Note that the addition and multiplication in that field are respectively the logical (Boolean) operations of "exclusive-or" and "and".

The linear transformation of multiplying a Boolean matrix $M=(m_{ij})$ by a Boolean $s \times 1$ vector V is accomplished in the same manner as one multiplies matrices of integers: The ith element of the product MV is the "dot" product of the ith row of M with the vector V. This dot product is the sum (exclusive-or) of the s bits obtained by multiplying each $m_{ij}$ with $v_j$.

The method described herein relies on using Boolean matrix multiplication to apply a permutation to an address space. If the matrix M is a square invertible $s \times s$ matrix, multiplication by M defines a permutation on s-tuples of bits. By regarding s-bit addresses as s-vectors a permutation is thereby defined mapping on a space of $2^s$ addresses.

For most of this discussion these addresses will be regarded as memory addresses in the memory hierarchy of a computer system, and the matrix multiplication will be employed in logical-to-physical address mapping.

For the sake of definiteness, a level of $2^d$ physical components in a memory hierarchy will be assumed. Physical addresses to the components consist of s bits (where d<s). The first d bits identify the component number, and the last s−d bits identify the different addresses within a component. A logical address is defined as an $s \times 1$ vector. The least significant bit of an address is the last ("bottom") element in the bit-string, and the most significant bit is the first ("top") element in the bit-string.

The algebraic constraints that determine the effect of a matrix on a given power-of-two stride will be described now. Conflict-free access with stride $2^t$ is desired, for some integer $t \geq 0$, across the $2^d$ physical components. Ideally, consecutive references should go to different components, with no component being referenced twice until each of the $2^d$ components are referenced once. This implies that the $2^d$ addresses 0, $2^t$, $2 \times 2^t$, $3 \times 2^t$, ..., $(2^d-1) \times 2^t$ must all map to distinct components.

The sequence of addresses described above forms a linear subspace S of the address space, if the logical address space is considered to be a Boolean vector space $F^s$ over the field F. In order for this space to be mapped uniformly across the physical memory component, the first d rows of the matrix M are considered, because these rows determine the physical components associated with a logical address. Let M' be the $d \times s$ matrix consisting of the first d rows of M.

The mapping of the subspace S to physical components is determined by the $d \times d$ submatrix of M', consisting of d adjacent columns of M', columns $s-t-d+1, s-t-d+2, \ldots, s-t$ for a stride of $2^t$. If that submatrix has maximal rank (rank=d), then the subspace S will map to $2^d$ distinct components. Otherwise, S will be mapped to a smaller subspace of $F^d$, mapping to $2^k$ memory modules, for $k \leq d-1$.

If various power-of-two strides $2^t$, $t=0, 1, 2, \ldots$ are considered, the following condition is required to cause such stride access to uniformly access the $2^d$ devices:

(A) All $d \times d$ submatrices consisting of d consecutive columns of M' are nonsingular.

A matrix is defined as nonsingular if and only if its determinant is nonzero or the matrix is invertible.

It is noted that condition (A) was derived from considering just the $2^d$ consecutive power-of-two stride accesses starting at address 0. It does not imply uniform access from other starting addresses. However, if the $2^d$ accesses start at another address a, the effect is almost as good: the $2^d$ accesses will not reference any one device more than twice. Note that the mapping M is conflict-free not only on S, but also on any cosets $a \oplus S$ of S, where $a \oplus S = \{a \oplus b \mid \text{all } b \text{ in } S\}$. If a stride access that begins at $a \neq 0$, then it will intersect at most 2 such cosets, namely $a \oplus S$ and $(a + 2^{t+d}) \oplus S$, $\oplus$ represents the logical bitwise XOR operation.

For an example of a matrix satisfying condition (A), see Table 1.

TABLE 1

| |
|---|
| 1 1 1 1 1 0 0 0 |
| 0 1 0 1 0 1 0 0 |
| 0 0 1 1 0 0 1 0 |
| 0 0 0 1 0 0 0 1 |
| A 4 × 8 Matrix satisfying condition (A). |

The above condition (A) implies reduced memory contention under power-of-two stride access.

Now suppose that condition (A) is satisfied, not only for every $2^d$ square submatrix of M', but also for submatrices of size $2^j$, for all $j \leq d$.

In other words, (B) Every square submatrix of M' that abuts on the top of M' is nonsingular.

This condition (B) then implies that any power-of-two stride access, starting at any address a, such that $S \wedge a = 0$ will result in uniform accesses to any of the subspaces of the physical address space defined by the first j bits of the address, wherein $\wedge$ represents the logical bitwise AND operation. For an example of a matrix satisfying condition (B), see TABLE 2.

TABLE 2

| |
|---|
| 1 1 1 1 1 1 1 1 1 1 1 1 1 1 1 1 1 1 1 1 1 1 1 1 1 1 1 1 1 |
| 1 0 1 0 1 0 1 0 1 0 1 0 1 0 1 0 1 0 1 0 1 0 1 0 1 0 1 0 1 |
| 1 0 0 1 1 0 0 1 1 0 0 1 1 0 0 1 1 0 0 1 1 0 0 1 1 0 0 1 1 |
| 1 0 0 0 1 0 0 0 1 0 0 0 1 0 0 0 1 0 0 0 1 0 0 0 1 0 0 0 1 |
| 0 1 1 1 1 0 0 0 1 1 1 1 0 0 0 0 1 1 1 1 0 0 0 0 1 1 1 1 |
| 0 0 1 0 1 0 0 0 1 0 1 0 0 0 0 1 0 1 0 0 0 0 0 1 0 1 |
| 0 0 0 1 1 0 0 0 0 0 1 1 0 0 0 0 0 1 1 0 0 0 0 0 0 1 1 |
| 0 0 0 0 1 0 0 0 0 0 0 0 1 0 0 0 0 0 0 0 1 0 0 0 0 0 0 0 1 |
| 0 0 0 0 0 1 1 1 1 1 1 1 1 0 0 0 0 0 0 0 0 0 1 1 1 1 1 1 1 |
| A 9 × 29 Matrix satisfying condition (B). |

The criteria (A) and (B) described previously for determining appropriate Boolean matrices are very important since they provide the characteristics of such matrices. A general procedure will now be described for constructing all matrices satisfying (B).

Theorem: Given a matrix of d rows and s columns, there exists a matrix M that satisfies condition (B). In fact, given any choice of subdiagonal bits $\{m_{ij} | i > j\}$, there is a unique Boolean matrix M having those subdiagonal elements and satisfying (B).

Proof: To obtain matrices satisfying (B), reason inductively on the rows of the matrix. Once the first k rows, $1 \leq k \leq s-1$ have been so as to satisfy (B), any choice of the remaining s−k rows that results in an invertible matrix M can be used.

Applying condition (B) to the first row implies that every element in that row must be 1, since the elements of that row are just the $1 \times 1$ submatrices.

Assume now that the first k−1 rows have been chosen, and that all $(k-1) \times (k-1)$ square submatrices, formed by adjacent columns of the resulting $(k-1) \times s$ matrix are invertible. Choose any k−1 values (0 or 1) for the first k−1 entries in row k. There is a value (either 0 or 1) for the element $m_{kk}$ such that the resulting $k \times k$ corner submatrix is nonsingular. To prove this, expand the determinant D for that submatrix along its bottom row. The following is obtained:

$$D = m_{k1}D_{k1} + m_{k2}D_{k2} + \ldots + m_{kk}D_{kk}$$

Wherein the above expression, $D_{ij}$ represents the cofactor of the element $m_{ij}$.

Note that by inductive hypothesis the determinant $D_{kk}$ is nonzero, hence 1. It is now possible to choose $m_{kk}$. If the first $k-1$ terms add to zero, $m_{kk}$ is chosen to be 1; otherwise choose $m_{kk}$ to be zero. In either case the square corner submatrix can be chosen to be nonsingular.

Proceeding along row k, the same argument can be applied always choosing $m_{k1}$, $1 > k$, so that the square submatrix having $m_{k1}$ in its lower right-hand corner is invertible. This completes the proof.

The above argument yields a construction of all matrices M satisfying condition (B). For each row k of matrix M it is possible to choose the first $k-1$ bits, and the remaining entries in that row are determined. There are precisely $2^{(d-1)d/2}$ matrices M, of d rows, satisfying (B).

One of these matrices that exhibits a symmetric pattern is illustrated in Table 2. Note how the one's in this matrix form a recursive pattern of repeating triangles; this fractal design is known as the "Sierpinsky gasket". In hindsight, it is possible to see an easier procedure for generating this matrix: Every element is the exclusive-or of its neighbors to the right and above. This arrangement of bits is the binary equivalent of Pascal's triangle.

Alternatively, it has been found that any of the four pairs of intersecting boundary rows and columns could be all '1's (unitary) e.g., the top or bottom row and the left or right column. In this case all other bits in the matrix are the exclusive OR of the two adjacent bits closest to said unitary row column.

When the conditions (A) and (B) are satisfied, conflict-free access is guaranteed when the memory locations are accessed in power-of-two strides. Other strides are also important, and it would be desirable to have the same elimination of conflict for such strides as well. However, it is not possible to eliminate all stride access conflicts. If this system is to be of use in general purpose computer systems, it is important that no stride access produces a hot spot; at any level of a memory hierarchy, or at least that memory contention problems resulting from stride access are extremely infrequent.

To deal with this problem some measures are defined of how well a given permutation deals with various stride accesses. Let M be a $d \times s$ matrix mapping of an s-bit address space, $F^s$, and assume a system of d devices. Thus M is a mapping from the set $F^s$ to the set $\{0,1,2, \ldots, d-1\}$. Let t and a be integers, where t is defined to be a stride, and a to be a starting address of the stride.

Consider the addresses in the stride, namely the set A consisting of $a, a+t, a+2t, \ldots, a+(d-1)t$. $C_i$ is defined to be the subset of V mapped to device i by M. i.e., $$C_i = \{X \epsilon V | M(x) = i\}$$

The nonuniformity of M with respect to (a,t) is defined to be the number of elements in the largest of the $C_i$'s.

$$M_{a,t} = \max_{0 \leq i \leq d-1} |C_i|$$

This gives the largest number of times any one device is accessed during a stride access to the d addresses $a, a+t, a+2t, \ldots, a+(d-1)t$. At least, with conflict-free access, the nonuniformity is 1; at most, it is d. For any power-of-two stride accesses using a permutation satisfying condition (A), the nonuniformity is either 1 or 2.

While the preceding discussion refers to specific physical components such as the individual modules of a large interleaved memory system, it has been found that the basic address permutation concept will produce improved address mapping across the congruence classes of a set associative cache memory. As will be described, because the addressing scheme for a cache is different, different bits in the address of a memory access will be used to perform a randomization.

DESCRIPTION OF PREFERRED HARDWARE EMBODIMENT

Referring now to a specific preferred embodiment of the invention, a general description of the overall operation of a computer system having a hierarchical memory including a high speed cache will be set forth for background purposes. It should be noted that FIGS. 1 through 4 constitute currently existing systems. However, this will serve to emphasize the manner in which the present invention may be readily inserted in such a system without changing any basic operating characteristics such as set forth in the address format as illustrated in FIG. 2 or the operation or organization of the cache directory as illustrated in FIG. 3.

Referring now specifically to the drawings, a number of terms utilized in the subsequent description will be set forth and defined first in terms of pre-existing systems and subsequently how they fit in to the present inventive concept.

FIG. 1 comprises a high level functional block diagram of a computer system consisting of a CPU 100, and a hierarchical memory comprising a cache 200, a dynamic look-aside table (DLAT) 400 and a main memory 500. Assuming a virtual memory system for every memory access, the CPU presents to the memory a virtual address of the accessed data/storage location. DLAT translates a virtual address into a real address to look up the cache and the memory. In order to facilitate the description of the disclosed embodiment it is assumed that the size of a line in the cache is 32 bytes, the number of congruent classes (CC's) is 128, the set associativity is 4 and the access unit of the cache from the CPU is a double word (DW), or 8 bytes. The standard fetch unit of the cache is assumed to be double word or 8 bytes, i.e., the cache always returns to the CPU a DW for every memory request. The overall memory organization is assumed to have a page size of 4096 bytes and has a total memory of 16 megabytes. The cache is assumed to be a real cache in the sense that the tag field in the cache directory is a real address, and not a virtual address as in the original address provided by the CPU. It is further assumed that the replacement mechanism, which determines a line to be placed for an incoming line when the cache is full, is a least-recently-used (LRU) replacement algorithm such as is well known in the art. A detailed description of such a replacement mechanism is set forth in U.S. Pat. No. 3,771,137 which is assigned to the assignee of the present invention. Other types of replacement algorithms such as first in first out, etc., could also be used. However, the particular replacement algorithm has no bearing on the operation of the present invention and is mentioned only to complete an overall description of the cache operation.

Figure 2:
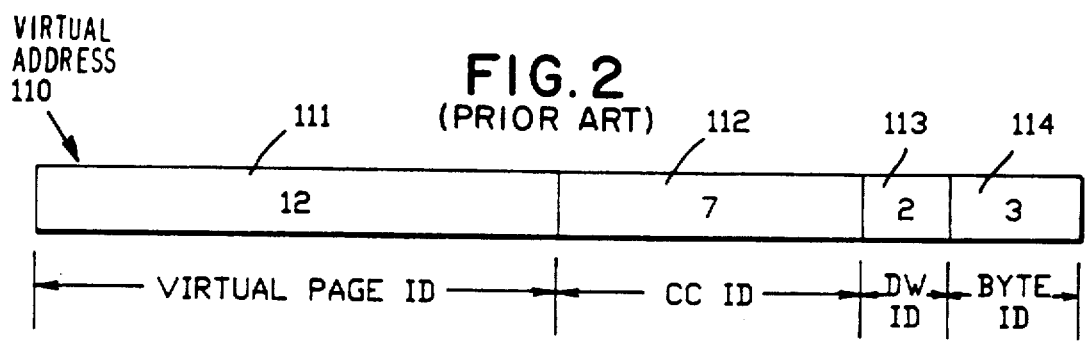
FIG. 2 illustrates the format of a memory address which may be used to access a set associative cache and illustrates various control fields therein.
Figure 3:
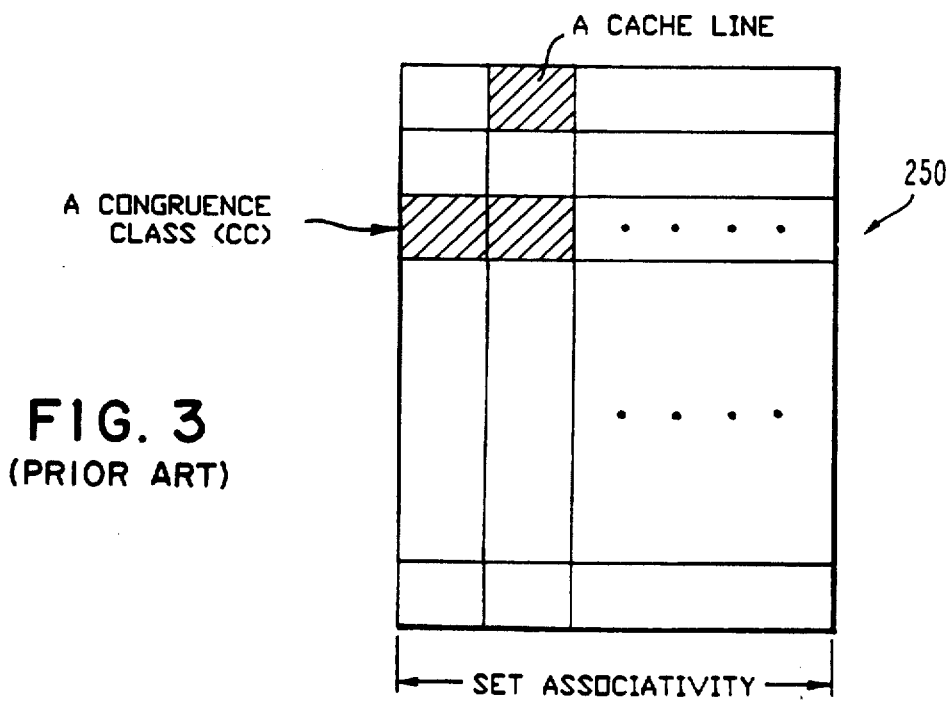
FIG. 3 comprises an organizational diagram of the data storage section of a set associative cache which organization is assumed for the purpose of describing the herein disclosed preferred embodiment.

FIG. 2 comprises an illustration of a typical virtual address format such as would be utilized with a computer system having the parameters described above. The 24 bit address 110 is broken down into three fields: A) the most significant ten bits 111 comprises the virtual page identifier and is sent to the DLAT 400 to be translated into a real page address (as will be appreciated by those skilled in the art), B) the next seven bit field 112 is the key to a congruence class where the cache line is possibly contained and C) the next two bit field 113 comprises the DW identifier in the cache line. Since a cache line contains 32 bytes, there are four DW's in a cache line.

Finally, the least significant three bit field 114 comprises the byte identifier and is not specifically utilized in the present embodiment.

FIG. 3 is a diagram illustrating the organization of a cache. It shows the data store of a set associative cache under the assumptions set forth above. The structure addressing mechanism registers data gating lines, etc. of the set associative cache is determined, as is well known in the art, by the line size, the particular set associativity, and the number of congruence classes.

Figure 4:
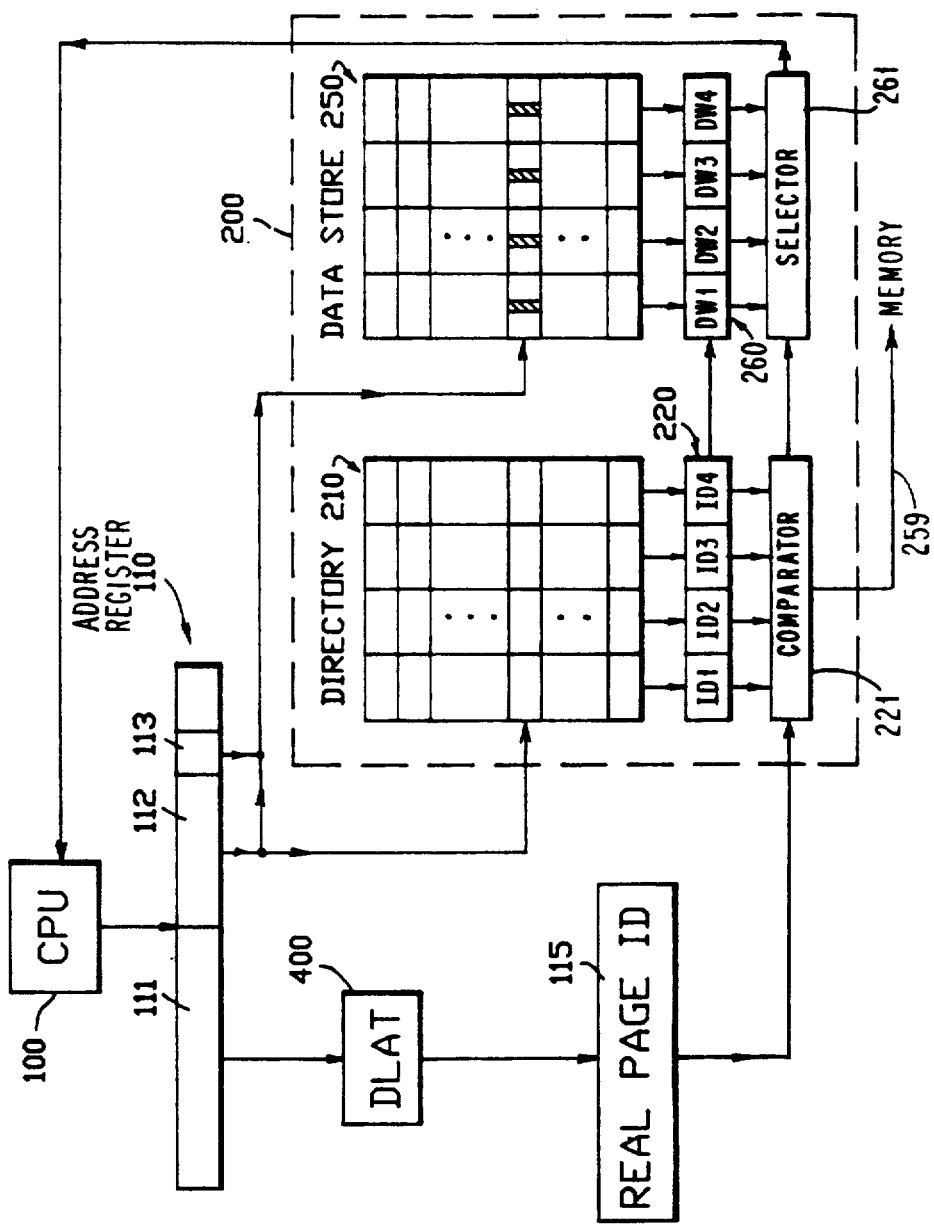
FIG. 4 comprises a diagram of an overall CPU and set associative cache illustrating the data flow which occurs during a normal cache access.

The functional block/data flow diagram of FIG. 4 serves to illustrate how a memory access from the CPU 100 is processed with a conventional set associative cache memory. An understanding of the operation of such a conventional system quickly facilitates an understanding of the present invention. First, virtual page identifier field 111 in the virtual address register 110 is sent to the dynamic look-aside table (DLAT) 400. The congruence class identifier in field 112 of the register 110 is sent to the cache directory 210 where it will address the correct congruent class in the directory. The byte identifier 113 is sent to the data store portion 250 of the cache 200.

The next operational sequence of the DLAT 400 provides a real page identifier which is stored in real page identifier register 115. Four line identifiers of the particular congruence class selected by the congruence class field 112 are read out from the cache directory to a buffer 220 whose contents may by tested by associated comparator 221. The four double words in the data store 250 which were appointed to by the double word address field 113 all within the congruence class of the data store 250 which was in turn pointed to by the congruence class field 112 are read out from the four cache lines included in that congruent class (four way set associative) and shown in the figure as being stored within the four regions of the buffer register 260 located below the data store 250. If the real page identifier supplied by the register 115 equals one of the four line identifiers supplied to the comparator 221, the corresponding double word in the register 260 is sent to the CPU. Thus, if the real page identifier had matched one of the line identifiers in the congruence class one of the outputs of the comparator 221 would have become active and caused the corresponding double word DW to be gated from the register 260 back to the CPU in a selector 261.

If on the other hand a successful match in the comparator 221 did not occur, a cache MISS would be signaled and a request to the main memory, via line 259 for the particular memory access would be necessary. Although the specific data flow is not shown as not constituting a part of the present invention, it will be understood by those skilled in the art that the request to memory would normally include the real page identifier constituting the real memory address as well as the fields 112, 113 and 114 which comprise the complete real address for the particular double word in memory.

When the missed cache line returns from memory, the specified double word is sent to the CPU and the whole line containing the double word is loaded into the cache data store, and the appropriate line identifier is loaded into the particular field of the congruence class as specified by the address in the particular field determined by the replacement algorithm. This completes the description of a normal cache access utilizing the cache architecture shown in FIG. 4 which has no mechanism for the randomization of permutation of congruence class addresses.

Figures 5, 6:
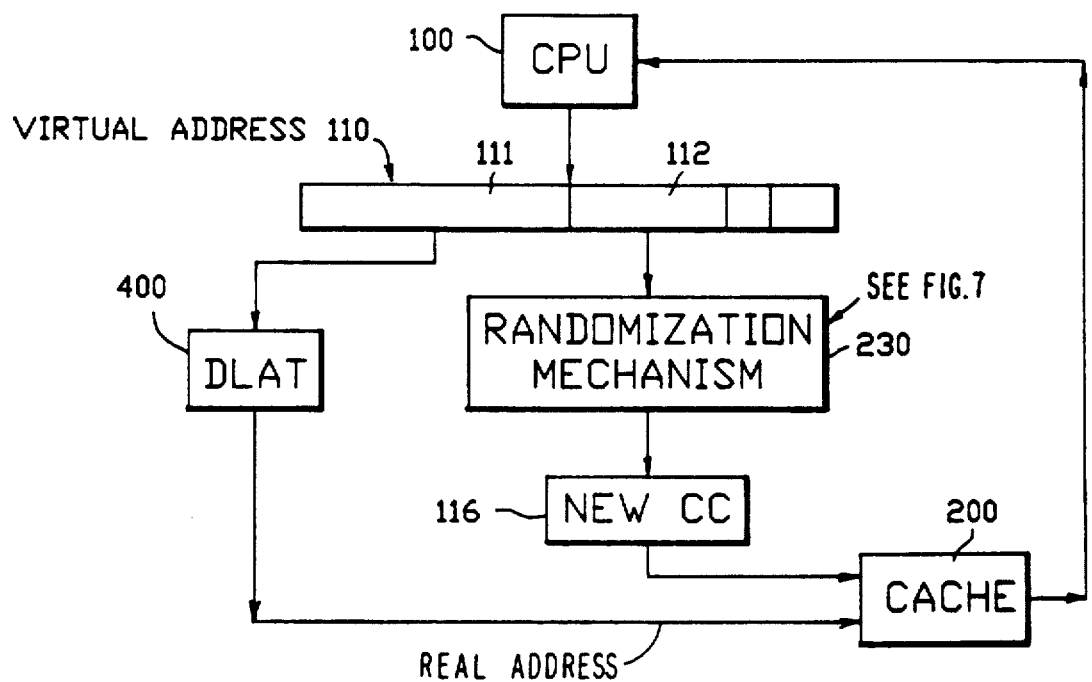
FIG. 5 comprises a simplified diagram of an overall computer system similar to FIG. 4 indicating the data flow of a cache access utilizing the herein disclosed (pseudo) randomization mechanism.
FIG. 6 comprises a diagram of a suitable 7×7 (pseudo) randomization matrix.

FIG. 5 is similar to FIG. 4 and discloses in high level functional block and data flow format the organization of a CPU provided with a cache memory employing the (pseudo) randomization mechanism of the present invention which produces significantly improved distribution of cache entries across the various congruence classes when consecutive memory accesses within the cache are separated by an address space which is a power-of-two.

The primary difference between the architecture of FIGS. 4 and 5 is the insertion of the randomization mechanism 230 which produces a new congruence class via the randomization technique utilized which is indicated as being stored in a register 116. As will be apparent this new congruence class field will have the same number of bits e.g., 7, in the present embodiment as the original 7 bit field 112 obtained from the original address provided by the CPU. This new randomized field 116 will indicate one of the congruence classes in the cache directory 210 and the system will proceed in exactly the same way as that of FIG. 5. It will of course be understood that the new congruence class field 116 must be utilized to access the particular line of the data store 250 which again will cause four double words to be read out of the data store into the register 260. Thus it will be seen that the fundamental operation of the overall cache storage system is the same for the embodiment of FIG. 5 as for the system of FIG. 4 which does not have the randomization mechanism of the present invention included therein.

A brief description of the randomization mechanism 230 insofar as it applies to the present embodiment is set forth below. For a more generalized discussion of the bit matrix multiply randomization technique, reference should be made to the previous section discussing the theoretical derivation of such a system as it applies to cache accesses. For an even more generalized description of such systems, reference should be made to the two previously referenced copending applications Ser. Nos. 07/114,909 and 07/114,795 07/114,795, now abandoned.

FIG. 6 shows a 7×7 randomization matrix M which will provide the desired congruence class randomization according to the principles of the present invention where power-of-two or other fairly regular strides would otherwise cause unwanted conflicts in memory usage. Since the address field comprises only 7 bits, only a 7×7 bit matrix is required. It should be noted in passing that in copending applications Ser. No. 07/114,909 and 07/114,795 a 9×29 bit matrix was used to produce the requisite 9 bits of address (for a 512 module memory). The reason that all 29 bits are required for use with the interleaved memory system of these two dockets is that a plurality of servers (e.g., memory) is serving a plurality of users (e.g., processors). Whereas in the present application a plurality of servers (e.g., congruence classes) is being utilized by a single user. Further, with congruence class designation, only the 7 bit field is considered as only these bits effect the congruence class selection whereas, in the aforementioned dockets, the complete address space e.g., all 29 bits would effect the ultimate memory module where a memory access is to occur.

Figure 7:
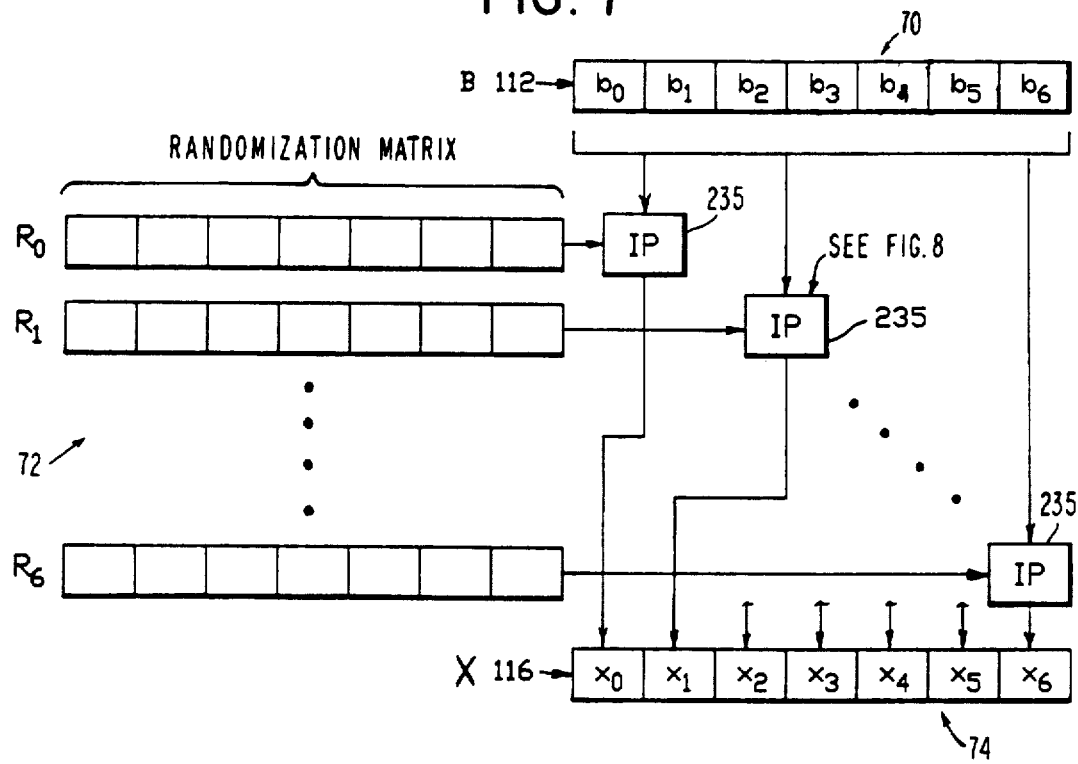
FIG. 7 comprises a diagram illustrating how the (pseudo) randomization matrix is used to produce another congruence class identifier (CCID) from the non-randomized CCID field in the original memory address.

The matrix of FIG. 6 was constructed as set forth previously according to both constraints (A) and (B). Also as stated it is a 7×7 matrix because there are 7 bits in the input (congruence class) field 112 to be randomized. As will be remembered in the bit matrix multiplication of the matrix M with the congruence class field 112, referred to here as B, the designation of the various bits are such that the rows in M referred to as R0, R1, ..., R6. Each row $R_i$, as will be appreciated, consists of a string of 7 bits. Next let the bits in the field 112 be designated as B = b0, b1, ... b6. Further let the randomized 7 bit output X be x0, x1, ..., x6 which comprises the new 7 bit congruence class field 116. As stated previously, this new field is produced by the bit matrix multiplication of B with the matrix M. This in turn is produced by generating the inner-product of each row $R_i$ of the matrix M with B to produce the $i^{th}$ bit in the randomized congruence class field 116. FIG. 7 illustrates a convenient mechanism for producing this result. As a first step the 7 bits of B, i.e., field 112, are latched from register 71 into the 7 inner-product (IP) boxes 235, and each row $R_i$ of 7 bits of the matrix is read from the matrix storage register 72 into their associated IP box. All 7 inner-products take place concurrently in the next time step. Each box produces a bit $x_i$, and all 7 of the $x_i$ are accumulated as the new field 116 in the indicated register 74.

Figure 8:
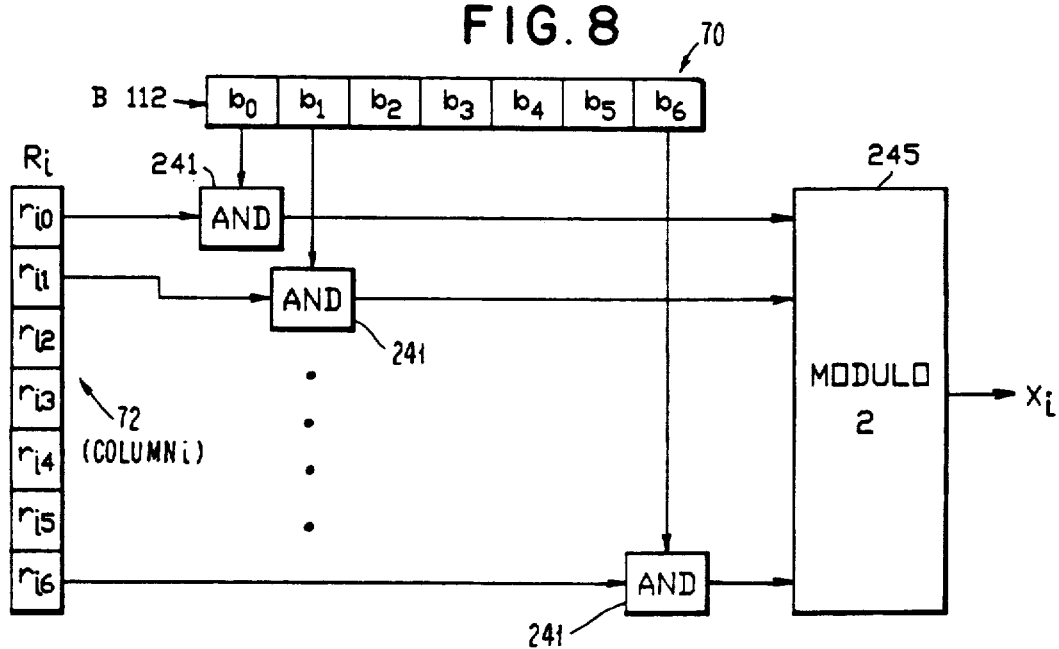
FIG. 8 comprises a diagram illustrating a hardware logic organization which might be used to implement the inner-product computation for producing a single bit of a randomized congruence class identifier.

FIG. 8 illustrates how the inner-product is constructed with the 7 bits in row $R_i$ and B. Suppose $R_i$ is in the string of $r_i0$, $r_i1$, ..., $r_i6$, at the first stage, a logical AND operation is performed in the pairs of bits $r_{ij}$ and $b_j$, (j=0, 1, ... 6) in blocks 241. All the AND operations produce 7 bits which are sent to a modulo-2 box 245. The operation of the modulo-2 box 245 is like a parity check block such that an output bit $x_i$ would equal a "1" if there are an odd number of "1" bits in the input; otherwise $x_i$="0". Thus, each of the inner-product blocks 235 of FIG. 7 would consist of 7 AND blocks 241 and a modulo-2 block 245, each producing its own respective output bit $x_i$.

Figure 9:
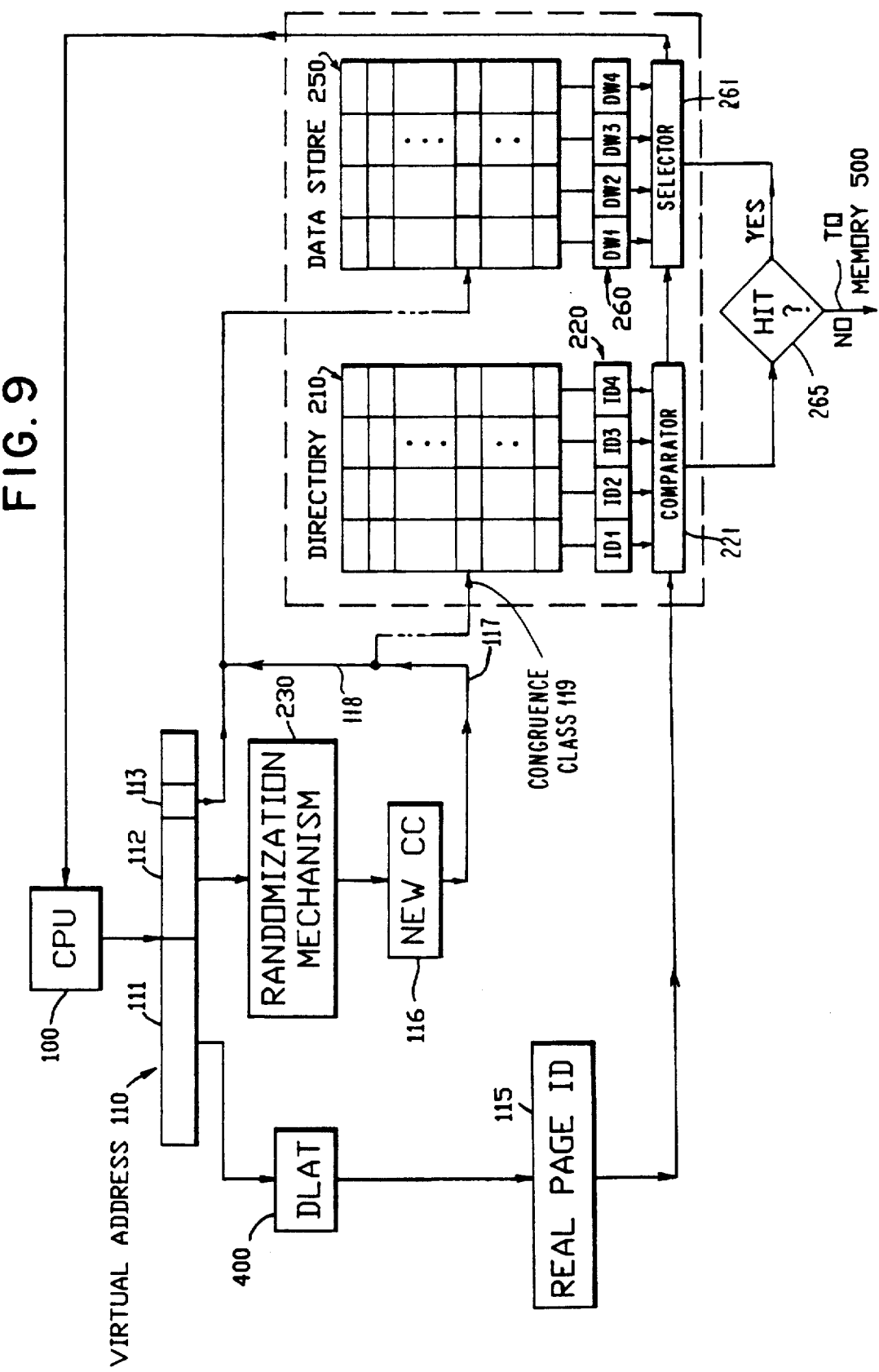
FIG. 9 comprises a diagram of the overall configuration of a system incorporating the (pseudo) randomization mechanism of the present invention illustrating the functional logic and the data flow as a particular congruence class address is randomized and utilized to access the cache directory and subsequently the cache store.

FIG. 9 is a combination functional block diagram and data flow diagram very similar to FIG. 4 and wherein the same numerals are utilized to represent similar functional units. This figure illustrates how the randomization mechanism 230 cooperates with the overall cache mechanism such as shown and described with respect to FIG. 4. It will of course be apparent that the overall architecture of FIG. 9 is essentially the same as FIG. 4 with the exception of the addition of the randomization mechanism and the new congruence class field 116 produced by the randomization mechanism. This field is introduced into the cache directory over line 117 as will be well understood and also is utilized to access the data store 250 of the cache via line 118 where it is combined with the field 113 in a manner similar to that described for FIG. 4. As will be well understood the new congruence class field 116 must replace the original field 112 used to access the data store. This is obviously because the randomized congruence class field now determines where data is stored within the data store portion of the cache 250 as well as in directory 210.

There will now follow a general description of a memory access cycle within the embodiment of the present invention set forth in FIG. 9. When the CPU generates a memory access, a number of actions take place at the same time during an operating cycle. During a first phase, the virtual page identifier field 111 is sent to the DLAT 400 to be translated into a real page identifier 115. The congruence class identifier 112 is sent to the randomization mechanism 230 which produces a permuted congruence class identifier field 116 which is transmitted via line 117 to the cache directory 210 and selects a particular congruence class 119 in the directory 210. The 4 real page identifiers in the new congruence class 119 pointed to by the randomized congruence class field 116 are read out from the cache directory to the buffer 220. Each of the double words (DW) indicated by the field 113 in the data store 250 located in the cache lines in said data store pointed to by the congruence class 119 are read out from the data store 250 into the DW buffer 260.

When the real page identifier 115 is ready at the beginning of the next stage of operation it is sent to the comparator 221 where it is compared with the 4 page identifiers stored in buffer 220. If one of the identifiers in buffer 220 equals the real page identifier, the corresponding DW in the DW buffer 260 is selected by block 261 and sent to the CPU. This completes a cache access cycle for that situation where the accessed address is found in the cache (e.g., a cache HIT).

In the situation wherein none of the page identifiers in the buffer 220 equals the real page identifier 115, the cache access controls cause a cache MISS to be generated. This is shown schematically in FIG. 9 by block 265. Referring to the previous discussion it would be the "yes" line from block 265 which would cause a particular DW to be accessed from the buffer 260 and transferred to CPU. In the event of a MISS, a signal would go via the "no" line to the memory 500 in which a normal memory access cycle would take place, at the address of the real page identifier 115 as will be appreciated by those skilled in the art.

When the missed line returns from memory it replaces the least-recently-used (LRU) line in the congruence class 119 pointed to by randomizing the memory field 112. Its page identifier would be stored at the location of the replaced LRU line in the directory 210 and the actual line stored at the corresponding location in the data store 250. Concurrently the requested DW in the missed line is sent directly to the CPU.

In order to maximize the randomization effect that is available with the present invention, it is preferred that the number of bits in the overall memory address 110 of any given memory access be as large as possible. The reason that only 7 bits are illustrated as being in the field 112 in the present description is due to the following constraints. First, since the cache is assumed to be a real cache, the real page identifier is not available until the DLAT has translated the virtual page identifier field 111. Therefore, the virtual bits 111 as shown in FIG. 2 cannot participate in the randomization. Second, it is preferred that the randomization mechanism does not slow down the cache access time, otherwise, referring to FIG. 9, it would be possible to implement the randomization mechanism 250 after the real page identifier 115 had been obtained.

However, this would cost the access time another CPU cycle. Third, the present randomization is on a cache line basis. Given a cache structure of a 128 congruence class the randomization coverage is limited to 7 bits. However, the following examples illustrate that, in some memory hierarchy architectures, the randomization mechanism could be applied to a larger range of addresses $A_n$.

1) As mentioned previously, if the cache access time is not a constraint, the randomization can take place soon after the real page identifier is generated by block 115 in FIG. 9.

2) In this case the whole real line address, 19 bits in all, could be randomized. If the cache were a virtual cache (known in the art, and specifically described in the previously referenced article by A. J. Smith), then translation is not needed for a cache access and the randomization can be applied directly on both field 112 and the virtual bits of field 111.

3) For some other set associative storage architectures in the memory hierarchy, such as a level 2 (L2) cache between the cache and the memory, a randomization on the full field 111 and 112 could be applied because, at this level, the address is already translated into a real address and the randomization can apply to the whole address.

It should accordingly be understood that the present invention could equally well apply to any set associative storages or tables in such hierarchical systems in which some particular data strides of the accesses would tend to lower the overall utilization of the storages or tables due to grouping in a small subset of the congruence classes as was explained previously and hence would significantly detract from the performance.

Use of the present invention will distribute the cache utilization more evenly across the address space, than would otherwise occur, due to the congruence class randomization.

These and other changes could readily be made in the accessing mechanism of such a set associative memory hierarchy by those skilled in the art without departing from the spirit and scope of the present invention.

Having thus described our invention, what we claim as new and desire to secure by letters patent is:

1. In an electronic computer system having an architecture including a central processor and a hierarchical memory system comprising a large relatively low speed random access memory and a small high speed cache memory, said cache memory including a data store section for storing lines of data from the system memory and a cache directory for indicating, at any time, the lines of system memory data currently resident in cache, said directory and data store being organized and accessible as a set of congruence classes into which any system memory address will map and a plurality of items in each class (set associativity), wherein a plurality of different addresses will map into any given class, means for accessing said memory system for storage and retrieval of data and further means for interrogating the cache memory for presence of an item of data therein identified by its system memory address whenever a memory access is requested, an improvement in a cache memory architecture which comprises means for improving distribution of data across said congruence classes including means for performing a permutation on a M-bit portion (X) of the system memory address (where M is a real positive integer greater than 1) which permuted M-bit portion (X') determines a congruence class of the address, said permutation means including means for performing a bit-matrix multiplication of said M-bit address with a predetermined data base dependent M-bit by M-bit permutation matrix, to produce a permuted M-bit address means connected to said permutation performing means for utilizing said permuted M-bit address (X') to access the cache directory and cache memory, and further means in said interrogating means for accessing an addressed congruence class in the cache directory and determining if a requested data item is present.

2. An improved cache memory architecture as set forth in claim 1 wherein said means for accessing an addressed congruence class includes means for determining if a line identifier which identifies every member of a congruence class currently stored in the directory matches an identifier field from the system memory address and, means connected thereto for accessing a data store portion of said cache memory at the permuted M-bit address (X') and accessing data lines therefrom included in the addressed congruence class, and further means for accessing a particular data line in the cache corresponding to a successful search in said directory for said identifier field.

3. An improved cache memory architecture as set forth in claim 2 wherein said means for accessing further includes means for detecting when a particular identifier is not present in the directory at the congruence class indicated and for producing a cache MISS sequence of operations.

4. An improved cache memory architecture as set forth in claim 1 wherein the means for performing said bit-matrix multiplication includes means for successively multiplying the bits of the M-bit address with successive rows of the M-bit by M-bit permutation matrix to form M successive new bits of address (X') which bits are utilized as a congruence class pointer in the cache for the data being accessed.

5. An improved cache memory architecture as set forth in claim 4 for use where power-of-two address strides are likely to be encountered wherein the M-bit by M-bit matrix is configured so that either a top or bottom row of said matrix is all '1's (unitary) and that either a right or left hand column is all '1's (unitary), remaining rows and columns of the matrix being configured so that all bits are an exclusive OR of two adjacent bits closest to the unitary column and row.

6. An improved cache memory architecture as set forth in claim 3 or 4 wherein said cache architecture is a virtual cache and the memory address supplied to the cache is a vertical address.

7. An improved cache memory architecture as set forth in claims 3 or 4 wherein said cache memory is a real cache and means are included for translating virtual addresses received from the central processor into real addresses for memory access.

* * * * *